US012645218B2

(12) United States Patent
Andriolo et al.

(10) Patent No.: US 12,645,218 B2
(45) Date of Patent: Jun. 2, 2026

(54) SELF-MOVING DEVICE, FUNCTIONAL MODULE, AND AUTOMATIC WORKING SYSTEM

(71) Applicant: Positec Power Tools (Suzhou) Co., Ltd, Jiangsu (CN)

(72) Inventors: Paolo Andriolo, Vicenza (IT); Davide Dalfra, Villimpenta (IT); Emanuel Conti, Falciano (SM); Federico Testolin, Torrebelvicino (IT); Zaiyue Zhang, Jiangsu (CN)

(73) Assignee: Positec Power Tools (Suzhou) Co., LTD., Suzhou (CN)

( * ) Notice: Subject to any disclaimer, the term of this patent is extended or adjusted under 35 U.S.C. 154(b) by 302 days.

(21) Appl. No.: 18/372,911

(22) Filed: Sep. 26, 2023

(65) Prior Publication Data

US 2024/0019867 A1     Jan. 18, 2024

Related U.S. Application Data

(63) Continuation of application No. 17/119,598, filed on Dec. 11, 2020, now Pat. No. 11,782,445, which is a
(Continued)

(30) Foreign Application Priority Data

Jun. 13, 2018     (CN) .......................... 201810610254.3

(51) Int. Cl.
G05D 1/00          (2024.01)
A01D 34/00       (2006.01)
(Continued)

(52) U.S. Cl.
CPC ......... G05D 1/0212 (2013.01); A01D 34/008 (2013.01); G01S 19/42 (2013.01);
(Continued)

(58) Field of Classification Search
CPC ............. G05D 1/0212; G05D 1/02231; G05D 1/0231; G05D 1/255; G05D 1/0255;
(Continued)

(56) References Cited

U.S. PATENT DOCUMENTS

2002/0156556 A1    10/2002  Ruffner
2008/0282494 A1*  11/2008  Won .................... A47L 11/4011
                                                                    15/412
(Continued)

FOREIGN PATENT DOCUMENTS

CA            2831006            1/2014
CN          102687625 A       9/2012
(Continued)

OTHER PUBLICATIONS

First Office Action in CN application No. CN201980006905.0, dated Mar. 18, 2022.
(Continued)

*Primary Examiner* — Yazan A Soofi
(74) *Attorney, Agent, or Firm* — Lee & Hayes, P.C.

(57)          ABSTRACT

The present invention provides a self-moving device, including: a housing, in which a primary cavity is formed; a moving module, mounted on the housing, and configured to actuate the self-moving device to move; a primary working module, mounted on the housing, and configured to perform a work task; a control module, including a main control board, and configured to control the moving module to actuate the self-moving device to move, and control the primary working module to perform the work task, where: the main control board is disposed in the primary cavity, where at least one secondary cavity is further formed in the housing; the secondary cavity is configured to mount at least one functional module different from the moving module and the primary working module; and the self-moving
(Continued)

device includes at least one first interface corresponding to the secondary cavity and capable of connecting to a second interface of the functional module, and the first interface is connected to the second interface, so that the functional module is mounted to the secondary cavity.

20 Claims, 12 Drawing Sheets

Related U.S. Application Data continuation of application No. PCT/EP2019/052547, filed on Feb. 1, 2019.

(51) Int. Cl.

| | | |
|---|---|---|
| *A01D 101/00* | (2006.01) | |
| *G01S 19/42* | (2010.01) | |
| *H04L 67/12* | (2022.01) | |

(52) U.S. Cl.
CPC ......... *G05D 1/0231* (2013.01); *G05D 1/0255* (2013.01); *G05D 1/0259* (2013.01); *A01D 2101/00* (2013.01); *H04L 67/12* (2013.01)

(58) Field of Classification Search
CPC ................ G05D 1/0259; A01D 34/008; A01D 2101/00; G01S 19/42
USPC .......................................................... 701/25
See application file for complete search history.

(56) References Cited

U.S. PATENT DOCUMENTS

| | | | |
|---|---|---|---|
| 2012/0189507 A1 | 7/2012 | Ko | |
| 2014/0121881 A1 | 5/2014 | Diazdelcastillo | |
| 2016/0088755 A1* | 3/2016 | Lee ......................... | B08B 13/00 |
| | | | 901/1 |
| 2016/0227975 A1* | 8/2016 | Ebrahimi Afrouzi ........................ | |
| | | | A47L 11/4066 |
| 2016/0302354 A1* | 10/2016 | Franzius .............. | A01D 34/008 |
| 2017/0020064 A1* | 1/2017 | Doughty ................ | A01G 25/09 |
| 2017/0168472 A1* | 6/2017 | Ando ................... | G06F 9/44521 |
| 2017/0364091 A1 | 12/2017 | Bennett et al. | |
| 2017/0364667 A1* | 12/2017 | Bennett ................. | E04H 4/1654 |
| 2019/0230850 A1* | 8/2019 | Johnson .............. | G05D 1/0287 |
| 2019/0294168 A1* | 9/2019 | Dalfra ................. | G05D 1/0088 |
| 2020/0047337 A1* | 2/2020 | Williams .............. | B25J 9/1676 |
| 2020/0201347 A1* | 6/2020 | Dalfra .................... | G05D 1/245 |
| 2021/0076563 A1* | 3/2021 | Andriolo ............. | G05D 1/0088 |

FOREIGN PATENT DOCUMENTS

| | | |
|---|---|---|
| CN | 103650754 A | 3/2014 |
| CN | 204762166 U | 11/2015 |
| CN | 107466580 A | 12/2017 |
| CN | 107479546 A | 12/2017 |
| CN | 107567825 A | 1/2018 |
| DE | 102009027557 A1 | 1/2011 |
| EP | 2412219 A1 | 2/2012 |
| EP | 3 081 068 A1 | 10/2016 |
| GB | 601680 A | 5/1948 |
| WO | 97/49528 A1 | 12/1997 |
| WO | WO2018019895 A1 | 2/2018 |
| WO | 2018/102338 A1 | 6/2018 |

OTHER PUBLICATIONS

First search in CN application No. CN201980006905.0, dated Mar. 18, 2022.
Communication of a notice of opposition in EP application No. EP19704259.1, dated Aug. 8, 2024.
European search opinion in EP application No. EP23219667.5, dated Mar. 26, 2024.
European search opinion in EP application No. EP23214595.3, dated Jun. 12, 2024.
European search report in EP application No. EP23219667.5, dated Mar. 26, 2024.
European search report in EP application No. EP23214595.3, dated Jun. 12, 2024.

* cited by examiner

SELF-MOVING DEVICE, FUNCTIONAL MODULE, AND AUTOMATIC WORKING SYSTEM

This application is a continuation application of U.S. patent application Ser. No. 17/119,598, filed on Dec. 11, 2020, which is a continuation bypass of International Application No. PCT/EP2019/052547, filed on Feb. 1, 2019, which claims the benefit of Chinese Patent Application No. 201810610254.3, filed on Jun. 13, 2018, all of which are hereby incorporated by reference as if fully set forth herein.

BACKGROUND

Technical Field

The present invention relates to a self-moving device, a functional module, and an automatic working system.

Related Art

Self-moving devices, for example, domestic devices such as automatic mowers and automatic vacuum cleaners, can liberate users from complex and miscellaneous labor and are increasingly popular with users. A self-moving device can automatically move in a preset working area and automatically perform a work task. To enable self-moving devices to complete automatic work more reliably and safely, and to provide better services for users, manufacturers continuously upgrade performance for the self-moving devices, including configuring various functional modules for the self-moving devices.

One problem in reality is that functional modules, particularly, functional modules capable of providing high performance for self-moving devices, are usually priced high. The functional modules may be necessary or preferable for specific working sites, and therefore, it is likely that only some users demand the functional modules. Manufacturers need to design machines of different models for users having different demands.

Another problem in reality is that to have competitiveness in the market, manufacturers improve machines, that is, renew the machines, and configure new functional modules for the machines. In a conventional mode, each time an improvement is made, machines of a new generation are produced. If a user wants to have a machine with a new function, the user needs to purchase an additional machine.

Still another problem in reality is that: To meet demands of different users and requirements of renewing machines, manufacturers produce machines of a plurality of models, resulting in difficulty in management.

Another problem with the design of self-moving devices results from the different working environments in which such devices may be required to work, including different kinds of terrain, different lighting levels, different numbers and kinds of obstacles and so on.

SUMMARY

Based on this, for the foregoing problems, it is desirable to provide a self-moving device on which different functional modules can be selectively mounted. The invention is not limited to solving the foregoing problems and in some aspects the invention described herein solves other problems.

In one aspect the present invention provides a self-moving device, including: a housing, in which a primary cavity is formed; a moving module, mounted on the housing, and configured to actuate the self-moving device to move; a primary working module, mounted on the housing, and configured to perform a work task; a control module, optionally including a main control board, and configured to control the moving module to actuate the self-moving device to move, and control the primary working module to perform the work task; wherein: the main control board is disposed in the primary cavity, where at least one secondary cavity is further formed in the housing; the secondary cavity is configured to mount at least one functional module different from the moving module and the primary working module; and the self-moving device includes at least one first interface corresponding to the secondary cavity and capable of connecting to a second interface of the functional module, and the first interface is connected to the second interface, so that the functional module is mounted to the secondary cavity.

A functional module as described herein may perform any kind of function that is useful in a self-moving device including but not limited to a work task such as grass cutting, sensing of e.g. location or working environment conditions, and external or internal (e.g. between modules) communication.

According to some embodiments of the invention, at least two different functional modules may be removably mounted in the same or different secondary cavities, and the at least two different functional modules may comprise sensing modules. The control module may control the operation of the working module and/or the moving module according to signals from one or more sensing modules. Different sensing modules may be mounted in different secondary cavities on the device. The secondary cavities may be positioned on the housing at different locations appropriate to working requirements of the sensing module.

In another aspect the invention provides a self-moving device comprising a housing, a moving module mounted on the housing and drivable to cause the device to move, a working module mounted on the housing configured to perform a work task, a plurality of cavities for receiving respective removable modules, a control module, and a communication system connecting the control module to the moving module, the working module and to the removable modules when mounted on the housing; wherein the control module is configured to detect a removable module, for example located in a cavity or mounted on the housing, and to modify a control program according to the detected type of the removable module, so that the self-mobile device can perform a function corresponding to the removable module. The modification may for example comprise retrieving relating to a particular module from any source such as but not limited to local storage such as on-board memory, a separate memory for example in a plug-in e.g. USB device or from a remote server.

In any of the embodiments described herein, the first interface may be detachably connected to the second interface.

In some embodiments, the at least one secondary cavity may be configured to mount different functional modules selectively. In other embodiments, a secondary cavity and functional modules may be designed such that different modules may be disposed in and function in the same cavity.

In any of the embodiments described herein, the at least one first interface corresponding to the secondary cavity may include a first mechanical interface for connection to a second mechanical interface of the corresponding functional module, and the first mechanical interface is connected to the second mechanical interface, so that the functional module is mounted to the secondary cavity.

In any of the embodiments described herein, the first mechanical interface may match the second mechanical interface in terms of shape, so that when the first mechanical interface is connected to the second mechanical interface in a matching manner, a relative position relationship between the functional module and the housing meets a preset condition.

In any of the embodiments described herein, for at least one functional module, when the first mechanical interface is connected to the second mechanical interface, the functional module covers an opening of a groove of the housing formed by the secondary cavity.

In any of the embodiments described herein, the housing may include at least one cover plate corresponding to the secondary cavity, and the cover plate includes a shielding state and covers an opening of a groove of the housing formed by the secondary cavity in the shielding state.

In any of the embodiments described herein, the at least one first interface corresponding to the secondary cavity may include a first conduction interface connected to a second conduction interface of the corresponding functional module, and the first conduction interface may be connected to the second conduction interface through a socket connector.

The first conduction interface may include a communications interface and/or a power interface.

In any of the embodiments described herein, the secondary cavity may be isolated from the primary cavity.

In any of the embodiments described herein, the functional module(s) may include a boundary detection module such as an ultrasonic module, a camera module, or a magnetic detection module.

The secondary cavity in which the ultrasonic module or camera module is mounted may be disposed on an upper part or a front part of the housing.

The ultrasonic module may include at least two ultrasonic probes and a support connected to the ultrasonic probes, and may be mounted to a secondary cavity through the support.

The secondary cavity to which a magnetic detection module is mounted may be disposed on a lower part of the housing.

The functional module(s) may include an interaction module such as a voice recognition or speech recognition module.

The secondary cavity to which the interaction module is mounted may be disposed on a rear part of the housing.

In any of the embodiments described herein, the functional module(s) may include a communications module such as a cellular communications module, a Wi-Fi module, a Bluetooth module, or a Sub 1G radio frequency module.

The secondary cavity to which the communications module is mounted may be disposed on an upper part of the housing.

The functional module may include a positioning module such as a satellite positioning module or a beacon positioning module.

The secondary cavity to which the positioning module is mounted may be disposed on an upper part of the housing.

In any of the embodiments described herein, the functional module(s) may include an additional or auxiliary working module such as a trimming module.

The secondary cavity to which the auxiliary working module is mounted may be disposed on a side part of the housing.

In any of the foregoing embodiments, the main control board may detect a functional module connected to the self-moving device, and correspondingly modify a control program of the self-moving device based on a type of the detected functional module, to enable the self-moving device to implement a function corresponding to the functional module.

The present invention further provides a functional module, configured to be mounted on a self-moving device, to assist the self-moving device to work, and including: a second interface, connectable to a first interface of the self-moving device, where the second interface is connectable to the first interface, to mount the functional module on the self-moving device.

The present invention further provides an automatic working system, including any one of the self-moving devices disclosed herein and one or more functional modules.

Compared with the prior art, in some aspects the present invention may provide the following beneficial effects: optimization of sensing capability according to the working conditions of the device; diversifying configurations of the self-moving device, so that products having different performance can be quickly assembled and formed based on different use requirements, to satisfy demands of different users; simplifying upgrading of machines; and reducing burdens on manufacturers in management on machines of a plurality of models.

BRIEF DESCRIPTION OF THE DRAWINGS

The foregoing objectives, technical solutions, and beneficial effects of the present invention can be described in detail by using the following specific embodiments that can implement the present invention, and can also be clearly obtained with reference to the accompanying drawings.

DETAILED DESCRIPTION

To resolve the problems in the prior art, embodiments of the present invention provide a self-moving device that is compatible with different functional modules to implement different functions. Specifically, several interfaces, capable of matching interfaces of different functional modules, are reserved on the self-moving device, to connect the self-moving device and the functional modules selectively. The embodiments of the present invention further provide an automatic working system including the foregoing self-moving device and a functional module. The term "self-moving device" is intended to include an automatic gardening device, an automatic vacuum cleaner, and the like. Descriptions are provided below by using an automatic mower system as an example.

Figure 1:
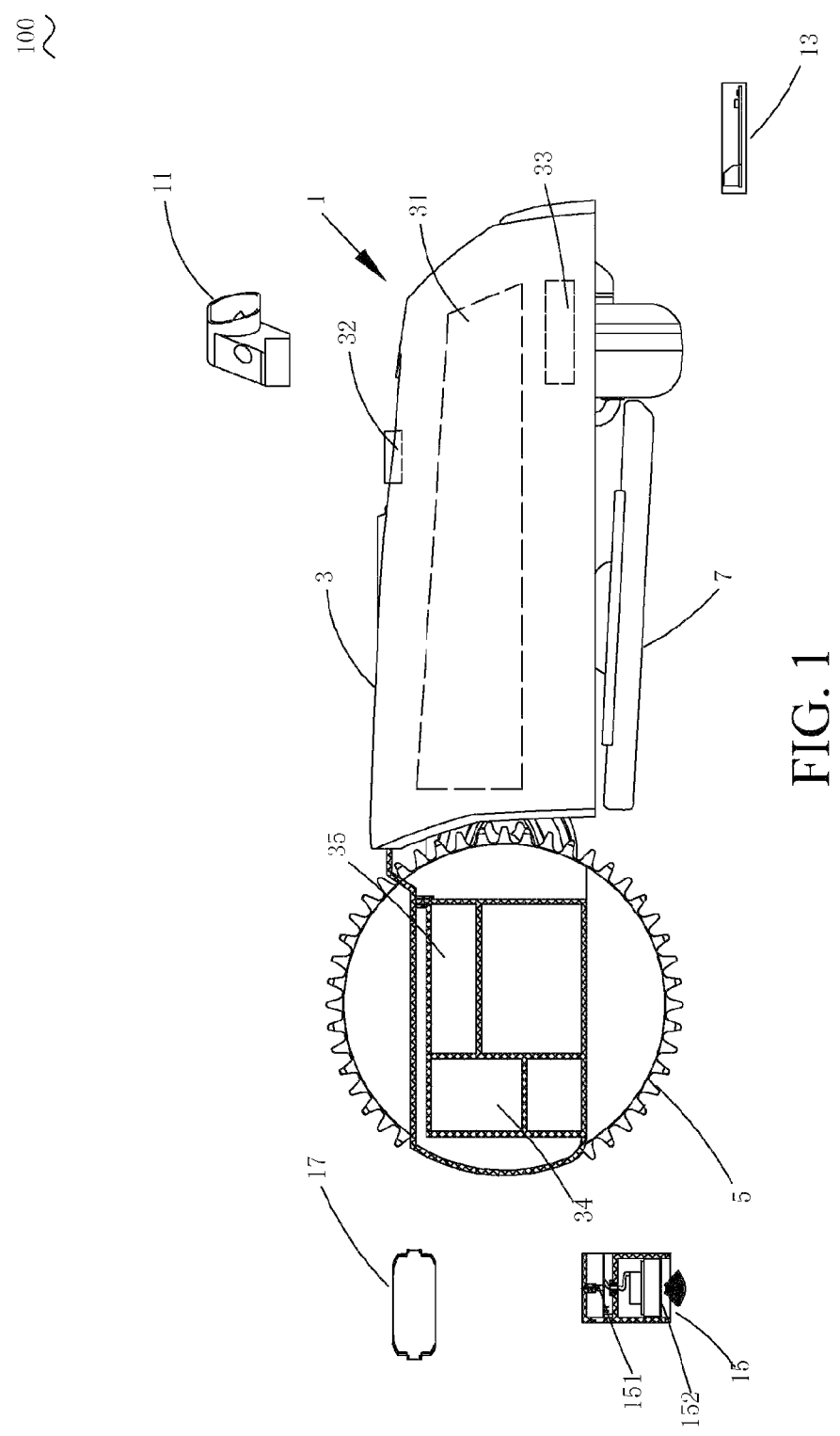
FIG. 1 is a diagram of the composition of an automatic mower system according to an embodiment of the present invention.

FIG. 1 is a diagram of composition of an automatic mower system 100 according to an embodiment. An automatic mower 1 includes a housing 3, a moving module 5 for example comprising one or more wheels, driven by a driving motor (not shown) to actuate the automatic mower 1 to move; and a primary working module 7, for example including a cutting blade disc and driven by a cutting motor (not shown) to perform mowing. In use, a control module (not shown in FIG. 1) controls the moving module 5 to actuate the automatic mower 1 to move, and controls the primary working module 7 to perform mowing. The moving module 5, the primary working module 7, and the control module are all mounted on the housing 3. The control module may comprise a computing system as known in the art and may include a processor and a memory and be configured to perform various functions in use. For example, the processor may be programmed to cause the control module to control the primary working module and/or the moving module.

Figure 2:
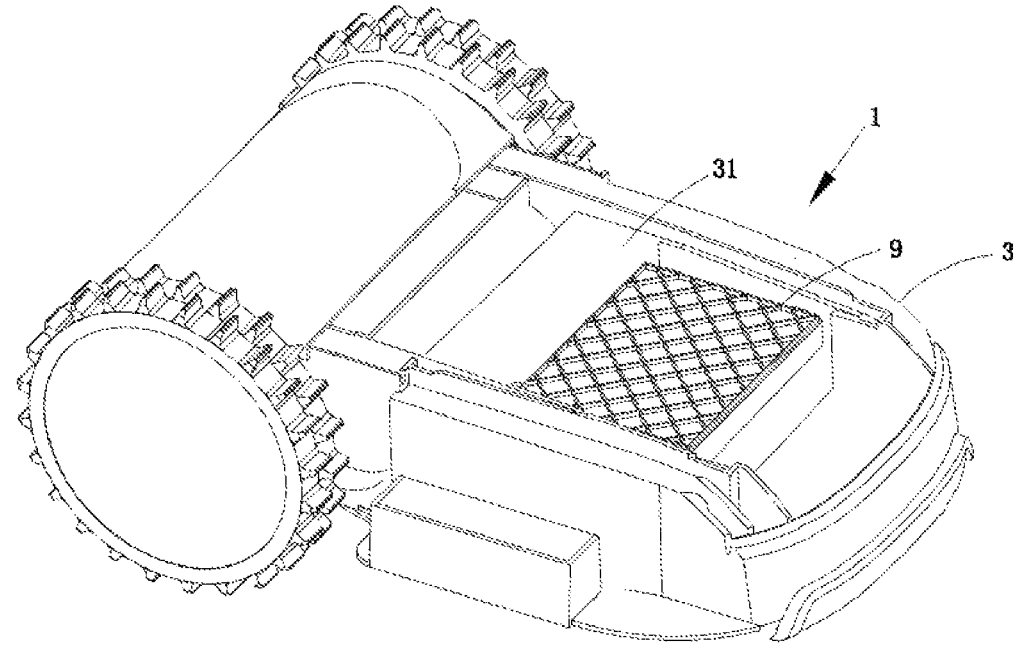
FIG. 2 is a diagram of an automatic mower according to an embodiment of the present invention after an upper cover thereof is opened.
Figure 3:
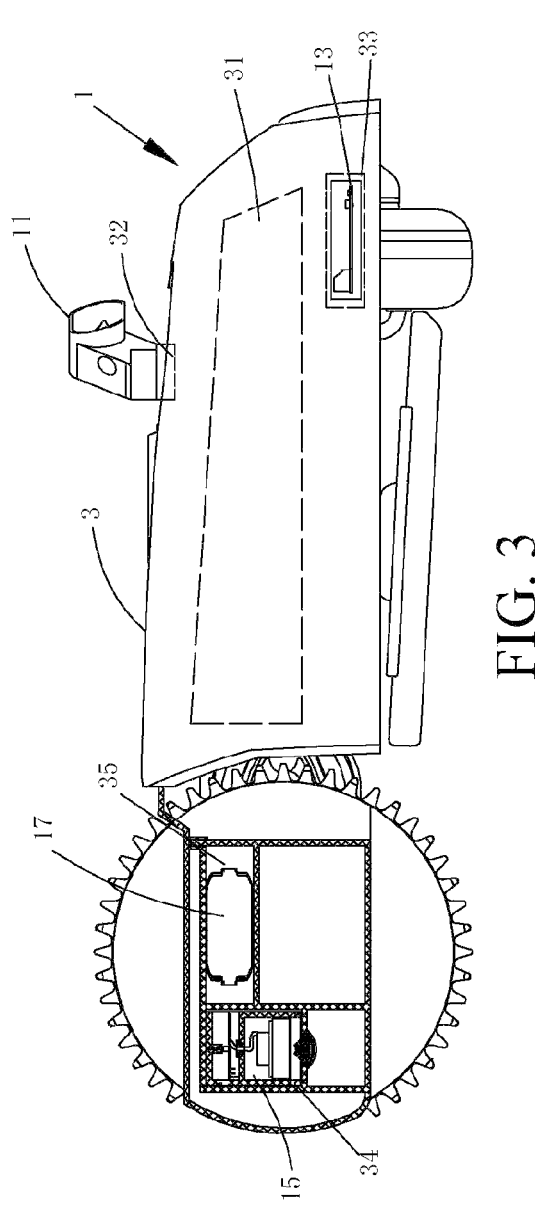
FIG. 3 is a schematic diagram showing multiple functional modules mounted on an automatic mower according to an embodiment of the present invention.

With reference to FIG. 1 and FIG. 2, in this embodiment, a primary cavity 31 is formed in the housing 3 of the automatic mower. Specifically, the housing 3 includes a base 4 and an upper cover, and the primary cavity 31 is formed between the base and the upper cover. A control module may be disposed in the primary cavity 31 and may comprise a control board 9 disposed in the primary cavity 31, and specifically, fixed onto the base. Control board 9 is referred to elsewhere herein as the "main" control board since some of the other modules may comprise control boards. FIG. 2 is a diagram of the automatic mower 1 after the upper cover thereof is opened, and the main control board 9 is disposed in the primary cavity 31. In this embodiment, at least one secondary cavity is formed in the housing 3, as shown by 32, 33, 34, and 35 in FIG. 1, and is configured to selectively, e.g. removably, mount at least one functional module different from the moving module 5 and the primary working module 7, as shown by 11, 13, 15, and 17 in FIG. 1. In any of the embodiments described herein one or more of the secondary cavities may be positioned in a part of the housing extending into the moving module, for example between the wheels, as shown in FIGS. 1-3 for example where cavities 34 and 35 are positioned between the wheels of the moving module 5. The secondary cavities 32, 33, 34, and 35 and the functional modules 11, 13, 15, and 17 shown in FIG. 1 are both illustrative. The functional modules are described below in detail. In this embodiment, the automatic mower 1 includes at least one first interface corresponding to the secondary cavity and connected to a second interface of the functional module, and the first interface is connected to the second interface, so that the functional module is mounted to the secondary cavity. Each cavity, e.g. secondary cavity, may be provided with an interface, for example an electrical connector, for connection to a functional module.

The automatic mower 1 on which the moving module 5 and the primary working module 7 are mounted can, under the control of the control module, automatically move and perform mowing, thereby implementing basic functions of the automatic mower 1. A device according to any embodiment of the invention may comprise at least one sensing module that is not designed to be removable, so that in a basic or default configuration the device has some sensing capability. A cavity for such a sensing module may be enclosed in the housing so as not to be accessible. The default sensor may differ from one embodiment to another. In some embodiments, the default sensor may comprise an inductor. Thus, to enable the automatic mower 1 to automatically recognize a working area, a boundary inductor of a kind known in the art, not shown in the figures, may be further mounted on the automatic mower 1, and configured to detect a current signal transmitted in a boundary line disposed along a boundary of the working area, so that the automatic mower 1 can determine whether the automatic mower 1 is located within the working area, thereby ensuring safe operation of the automatic mower 1. Whereas some or all of the functional modules described herein may each be mounted in a cavity which is accessible by a user, for example accessible from the outside of the housing, a non-removable sensor, for example an inductor, may be mounted inside the housing where it is not readily accessible. The automatic mower 1 may be further provided with a STOP button, not described further herein and a control panel or display and/or a communications module, to implement interaction with a user, further described with reference to FIG. 10.

Based on that the automatic mower 1 in this embodiment has basic functions, respective functional modules may be selectively mounted on the automatic mower 1. On the one hand, configurations of the automatic mower 1 are diversified, so that products having different performance can be quickly assembled and formed based on different use requirements, to satisfy demands of different users. On the other hand, upgrading of machines is simplified, and may only require addition or replacement of different functional modules without replacing a host. Further, manufacturers only need to produce machines of a basic model and several accessories, so that burdens on the manufacturers in management on machines of a plurality of models are relieved. Because a basic structure of the automatic mower 1, including the housing 3, the moving module 5, the primary working module 7, and the like, has a relatively long service life and works relatively stably, the manner of replacing a functional module can prolong a service life of a machine, make maintenance more convenient, provide a possibility for updating or upgrading a machine, and bring benefits to manufacturers and users.

In the automatic mower 1 in this embodiment, not only a mounting position is reserved for each functional module, but also a corresponding secondary cavity is designed for mounting a functional module. The primary cavity 31 of the automatic mower 1 is configured to mount the control module, for example the main control board 9, because the control module or main control board 9 may have a relatively high requirement for protection and need to be sealed in a preferable manner. If the functional module and the main control board 9 are mounted in a same cavity, when the functional module is mounted, the cavity is exposed, and consequently, the main control board 9 is in a risk of being damaged and failing. In addition, when the functional module is mounted, if the primary cavity 31 is exposed in front of an installer, because a relatively large quantity of components are included in the primary cavity 31, it is unlikely to present a neat mounting interface to the installer, which, particularly when a consumer mounts a functional module voluntarily, is harmful to user experience. Therefore, several secondary cavities are disposed on the housing 3 of the automatic mower 1, and configured to mount respective functional modules. This not only is beneficial to protection of the components in the primary cavity 31, particularly, the main control board, but also can improve user experience and facilitate user operation.

In this embodiment, the at least one first interface corresponding to the secondary cavity may include a first mechanical interface, designed to be connected to a second mechanical interface of a corresponding functional module, and in use the first mechanical interface is connected to the second mechanical interface in a matching manner, so that the functional module is mounted on the housing 3 of the automatic mower. Specifically, a matching manner in which the first mechanical interface is connected to the second mechanical interface may be a screwed connection, a clamped connection, an internal shape matching the external shape of the functional module, or the like, depending on a mounting requirement of the functional module. For example, the screwed connection may be used when a requirement on mounting strength of the functional module is relatively high, and the clamped connection or shape matching connection may be used when a requirement on mounting strength of the functional module is relatively low. Because the first mechanical interface is connectable to the second mechanical interface in a matching manner, the functional module may have a preset position relationship with the housing 3 of the automatic mower. For example, the functional module may be fixedly mounted at a specific position of the housing 3, or the functional module may rotate about a specific fixed axis relative to the housing. The first mechanical interface may be disposed in the secondary cavity, or may be disposed on the housing and around the secondary cavity, provided that the functional module can be mounted to the corresponding secondary cavity. The first mechanical interface of the automatic mower 1 may match the second mechanical interface on the functional module in terms of shape, so that when and only when the first mechanical interface and the second mechanical interface fit each other, the functional module can be mounted on the housing 3 of the automatic mower 1. When the first mechanical interface is connected to the second mechanical interface in a matching manner, a relative position relationship between the functional module and the housing 3 of the automatic mower meets a preset condition. Such design can prevent the automatic mower 1 from a running fault caused by an incorrect mounting manner, and may be friendlier to an installer. The preset condition that the relative position relationship between each functional module and the housing 3 of the automatic mower may need to meet is described below in detail.

FIG. 3 is a schematic diagram showing multiple functional modules mounted on an automatic mower.

In any of the embodiments described herein, corresponding secondary cavities may be designed differently in protection based on different mounting positions of respective functional modules on the housing 3 and/or different requirements for protection of the respective functional modules. Specifically, some secondary cavities should not be exposed. For example, if a secondary cavity disposed at the top of the housing 3 is exposed, an appearance is affected, and the secondary cavity is likely to accumulate water when being caught in rain. When a functional module itself has a protection requirement, a secondary cavity in which the functional module is placed should not be exposed. Because a functional module is selectively mounted on the automatic mower 1 in this embodiment, when a corresponding secondary cavity is not used for mounting a functional module, a cover plate may be used to cover the corresponding secondary cavity, to isolate the secondary cavity from the outside, and to produce a decoration effect. Specifically, the housing 3 includes at least one cover plate corresponding to a secondary cavity, and the cover plate includes a shielding state and covers an opening of a groove of the housing 3 formed by the secondary cavity in the shielding state. When a corresponding functional module is mounted in the secondary cavity, in an embodiment, the cover plate is still mounted on the housing 3, and shields the functional module placed in the secondary cavity. The cover plate may be pivotally connected to the housing 3 to be opened and closed or may be detachably connected to the housing 3. In another embodiment, after the cover plate is taken off, the functional module covers an opening of a groove of the housing 3 formed by the secondary cavity. Certainly, some secondary cavities, for example, a secondary cavity facing a working plane, may alternatively be exposed directly. This does not affect an appearance.

When a functional module is mounted on the automatic mower 1, to implement a corresponding function, in addition to a requirement on a mounting position, power supply and communication problems may also need to be resolved. In particular, a communication problem between the functional module and the main control board 9 may need to be resolved, to implement data and/or control signal transmission between the functional module and control module including main control board 9. In this embodiment, the at least one first interface corresponding to any of the secondary cavities may include a first conduction interface, to be connected to a second conduction interface of the corresponding functional module 11, 13, 15, or 17. The first/second conduction interface (hereinafter also referred to as a terminal for short) may include a power interface and a communications interface. In this embodiment, the first conduction interface may be connected to the second conduction interface through a plug and socket connector, for example a plug may be provided in the cavity, for example connected to the control module via a lead, and a mating socket may be provided in the corresponding functional module, or vice versa. In some embodiments the same plug/socket design may be used for each of the functional modules.

Figure 4A:
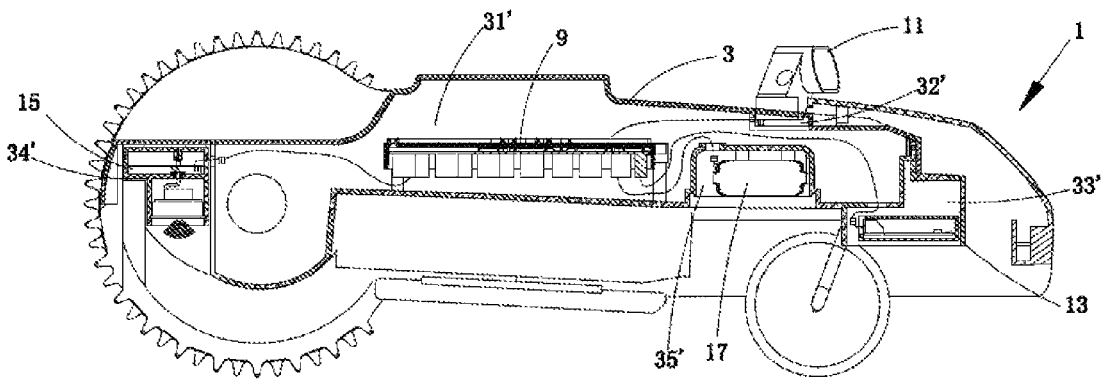
FIG. 4A is a cross-sectional view of an automatic mower according to another embodiment of the present invention.

FIG. 4 is a cross-sectional view of an automatic mower 1 according to another embodiment of the present invention in which the positions of some of the functional modules are different from the embodiment of FIGS. 1-3. In other respects the embodiment of FIG. 4 may be the same as the embodiments described elsewhere herein. FIG. 4 shows connection relationships between functional modules 11, 13,

9

Figure 4B:
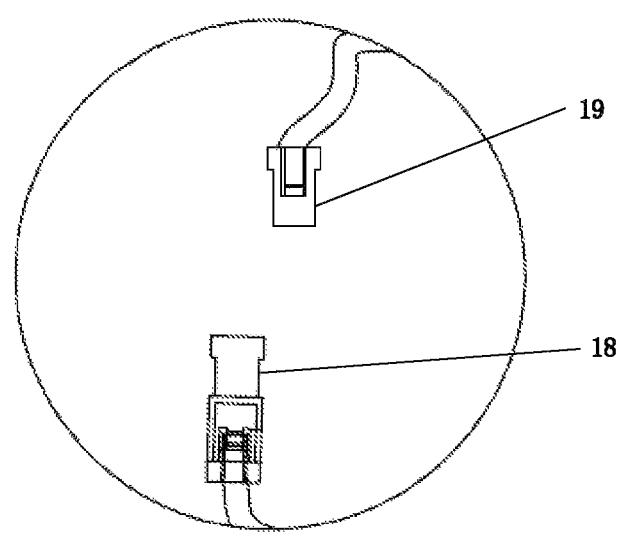
FIG. 4B is a partially enlarged diagram of a plug and socket connector in FIG. 4A.

15, and 17 mounted in respective secondary cavities 32', 33', 34', and 35' and a main control board 9 mounted in a primary cavity 31'. All of the secondary cavities and functional modules shown in FIG. 4 are illustrative. As shown in FIG. 4, several lead wires are led out from the main control board 9 and extend from the primary cavity 31' to the respective secondary cavities 32', 33', 34', and and ends of the lead wires are connected to socket connectors to form a first conduction interface for respective functional modules. FIG. 4B is a partially enlarged diagram of a suitable socket connector 18 and mating plug 19. Therefore, a first conduction interface in a cavity may be connected to a second conduction interface provided on a respective functional module, so that the functional modules 11, 13, 15, and 17 may be connected to a control module, for example at a main control board 9. The foregoing lead wires may include power supply wires and communication wires. The power supply wires are used to supply electric energy to the functional modules, and the communication wires are used to transmit data and/or control signals. In this embodiment, the functional modules 11, 13, 15, and 17 may be connected to the main control board 9 by using a CAN bus which may be provided on the main control board 9. The CAN bus may be extended to have a plurality of interfaces for example in the form of plugs or sockets or one or more of each, can be conveniently connected, and can implement connectivity with functional modules in a "plug-and-play" type arrangement. A universal asynchronous receiver/transmitter "DART" may be provided on the mail control board 9, and known communication protocols such as I²C and SPI, or the like may be used. An interface form may be an interface similar to a USB interface, and can be conveniently plugged and unplugged. In this embodiment, the CAN bus interface may be divided into a plurality of CAN bus interfaces through an adapter in a multi-stage connection manner, to meet connection requirements of more functional modules. In this embodiment, the lead wire extending from the main control board 9 extends from the primary cavity 31' to the secondary cavities 32', 33', 34', and 35', so that when the functional module 11, 13, 15, and 17 are mounted, an installer can conveniently find a connector, to facilitate mounting. It can be understood that FIG. 4 shows a state in which the functional modules 11, 13, 15, and 17 have been mounted. In this case, possibly because of a limited accommodation space of the secondary cavity, the socket connector enters the primary cavity through a through-hole between the primary cavity and the secondary cavity, but when the functional module is detached, the socket connector can be easily dragged back to the secondary cavity. Certainly, structural design may alternatively be made to prevent the connector or first interface, e.g. first conduction interface such as plug 19 or socket 18, from entering the primary cavity 31 or 31'. The first conduction interface may be flexibly disposed in the secondary cavity, or may be fixed onto a wall of the secondary cavity.

In this embodiment and in other embodiments of the invention, the primary cavity 31' of a housing 3 may be isolated from the secondary cavities 32', 33', 34', and 35', to protect the primary cavity 31'. Specifically, in the embodiment shown in FIG. 4, the primary cavity 31' is isolated from the secondary cavities 32', 33', 34', and 35' in a sealed manner to prevent water vapor, dirt, and the like from entering the primary cavity through the secondary cavities and damaging the main control board 9. In this embodiment, because the lead wires extending from the main control board 9 need to pass through the housing between the primary cavity 31' and secondary cavities 32', 33', 34', and 35', an opening is formed between the primary cavity 31' and the secondary cavities 32', 33', 34', and 35', protection on the primary cavity 31' can be ensured in a manner such as disposing a seal strip on the opening.

In this embodiment of the present invention, power may be supplied to the functional modules through the first/second conduction interface or in another manner. In an embodiment, the automatic mower 1 includes an energy source module, for supplying electric energy for movement and work of the automatic mower 1. Specifically, the energy source module may include a battery pack, not shown. In another embodiment, the battery pack may be detachably connected to the automatic mower 1. Regardless of whether the battery pack is fixedly connected to or detachably connected to the automatic mower 1, energy may be supplied to a functional module by connecting output of the battery pack to the functional module. The foregoing energy supply manner is particularly suitable for a situation in which energy consumption of a functional module is high. In another embodiment, energy may alternatively be supplied to the functional module by an independent battery, for example housed with the functional module, for example solely providing energy to the functional module, or supplying energy to other modules, for example via the CAN bus. When the functional module is disposed at the top of the automatic mower 1, a photovoltaic unit may be disposed to convert optical energy into electric energy to supply energy to the functional module and so on. The photovoltaic unit may be integrated with the respective module or may comprise a separate removable module.

Respective functional modules and cooperation between the respective functional modules and the automatic mower 1 are described below in detail. According to some embodiments of the invention, a plurality of removable modules also referred to herein as functional modules may comprise sensing modules of different kinds. A control module, for example comprising main control board 9, may control the movement of the mower and/or working of primary working module 7, based on signals from the sensing modules.

Thus some embodiments of the invention provide a self-moving device comprising a housing, a moving module mounted on the housing and drivable to cause the device to move, a working module mounted on the housing configured to perform a work task, a plurality of cavities for receiving respective removable modules, a control module, and a communication system connecting the control module to the moving module, the working module and to the removable modules when mounted on the housing; wherein at least two of the cavities are arranged to receive sensing modules using different sensing technologies selected from optical, magnetic, ultrasonic and satellite positioning, and the control module is configured to control the at least the moving module and the working module based on signals received from one or more sensing modules, for example according to which sensing modules are present. Thus a device may be equipped to use different kinds of sensing technology even if they are not all used in a particular configuration. In some embodiments, the device includes cavities for an ultrasonic sensor, a magnetic detection module and a satellite positioning module.

The communication system may for example include a CAN bus. The cavities may be positioned at different locations on the housing according to the function of the respective sensing module. For example, at least one cavity may be provided on the top of the housing and another may be provided on the underside of the housing. A sensing module using ultrasound technology may comprise an ultrasonic module as described further herein for boundary detection or collision prevention, or an ultrasonic beacon positioning module as is known in the art. A magnetic sensing module may for example use induction sensing or may sense static magnetic fields. An automatic working system according to some embodiments of the invention may use both static and changing magnetic fields. A sensing module using optical technology may comprise a camera or laser range finder or any other optical sensor. A sensor using satellite technology may comprise a GPS module for example.

Additional cavities may be provided for any of an interaction module, e.g. voice interaction module or other user interface, and a communications module. A communications module may use Wi-Fi, radio, mobile communication such as GPS or any combination of these technologies.

Thus a device may be provided with various kinds of sensing and is not restricted to optical sensing for example.

In the embodiments shown in FIGS. 1-4 a plurality of cavities for respective sensing modules are provided. The sensing modules comprise at least one or more inductive coils (which may or may not be removable), a magnetic sensor optionally mounted beneath the housing, and an ultrasonic sensor optionally mounted on top of the housing. Additional sensing modules for which cavities may be provided may comprise a positioning, e.g. GPS, module. One or more cavities may be able to receive more than one kind of sensor. For example the cavity for the ultrasonic sensor may alternatively accommodate a different kind of sensor, for example a camera or laser sensor.

In any of the embodiments, the functional modules may include a boundary detection module. Specifically, the boundary detection module may include a remote sensing boundary detection module, for example, a non-contact obstacle detection module that may be specifically an ultrasonic module configured to detect an obstacle in a direction along which the automatic mower moves. The remote sensing boundary detection module may alternatively include a camera, laser radar, and the like, and may be configured to probe a boundary of a working area or an obstacle within a working area. Descriptions are provided below by using an ultrasonic module 11 as an example. The ultrasonic module can prevent the machine from hitting and harming children, pets, furniture, saplings, and the like, fences and other barriers, in a garden, to dispel misgivings of a user about safety regulations.

Figure 5A:
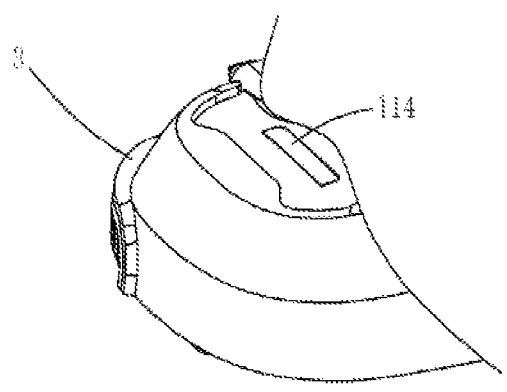
FIG. 5A, FIG. 5B, and FIG. 5C are schematic diagrams of an ultrasonic module according to an embodiment of the present invention before, during, and after mounting.
Figure 5B:
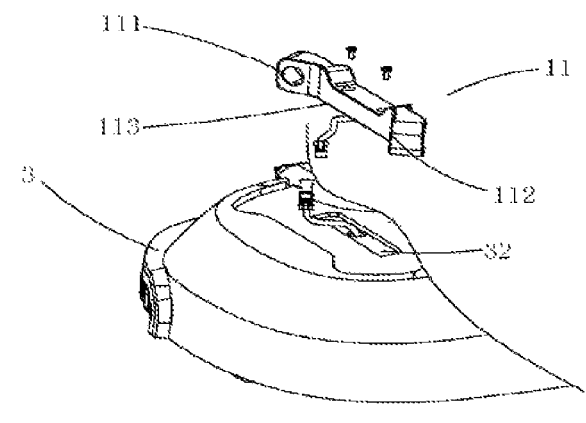
Figure 5C:
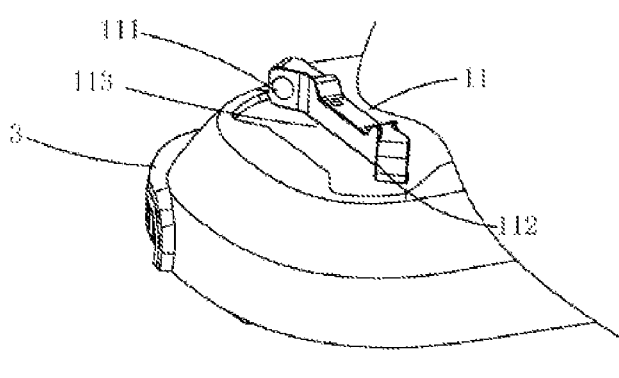

FIG. 5A, FIG. 5B, and FIG. 5C are respectively schematic diagrams of a boundary or obstacle detection module comprising an ultrasonic module 11 before, during, and after mounting. As shown in FIG. 5A, FIG. 5B, and FIG. 5C, in this embodiment, a position reserved on the housing 3 of the automatic mower for the ultrasonic module 11 is on an upper part of the housing 3, so that when the ultrasonic module 11 is mounted on the housing 3, the ultrasonic module 11 is disposed in a protruding manner relative to the housing around the ultrasonic module 11, particularly, relative to the housing within a detection angle range and around the ultrasonic module 11, so that a transmit/receive path of the ultrasonic module 11 is not blocked by the housing 3. In any of the embodiments described herein, the ultrasonic module 11 may detect an obstacle in the direction along which the automatic mower 1 moves, and is disposed facing the front of the direction along which the automatic mower 1 moves. Therefore, the ultrasonic module 11 is not only mounted on the upper part of the housing 3, but also mounted on a front part of the housing 3, to better prevent the transmit/receive path from being blocked by the front part of the housing. It should be noted that in contrast to e.g. vehicle reversing sensors, the module 11 is mounted on the top of the housing 3, rather than a "bumper" or side or front wall, and spaced back, in the forward direction of travel, from the very front of the automatic mower, so as to have a wider field of view relative to the mower than if the module 11 was mounted at the front of the mower.

In this embodiment, the ultrasonic module 11 includes at least two ultrasonic probes 111 and 112, for a position relationship and an angular relationship between the two probes, refer to International Application No. PCT/CN2017/099698. Details are not described herein again. In this embodiment, the ultrasonic module 11 further includes a support 113 connected to the probes 111 and 112, and is mounted on the housing 3 of the automatic mower through the support 113. Because cooperation between a plurality of probes 111 and 112 is demanded for implementing the function of the ultrasonic module 11, there are strict requirements on the position relationship and the angular relationship between the probes 111 and 112. For a conventional automatic mower, a functional module has been mounted on the housing before delivery or is even integrally formed with the housing and does not need to be additionally mounted. Therefore, there is no problem of mounting precision. However, a functional module is selectively mounted on the automatic mower 1 in this embodiment, when there is a strict requirement on a mounting position or a mounting angle of the functional module, a relatively high requirement is imposed on an operation of an installer. Moreover, when the installer is a user, such a requirement reduces usability of a product, and the product may be faulty because of a mounting problem of the functional module. This is harmful to user experience. To resolve the foregoing problem, in any of the embodiments described herein, an ultrasonic module may comprise a plurality of ultrasonic probes in a predetermined relationship. For example, the plurality of ultrasonic probes 111 and 112 may be on respective arms extending from the support 113, for example integrated through the support 113, to integrate the ultrasonic module 11. In this way, the position relationship and the angular relationship between the ultrasonic probes 111 and 112 have been fixed before delivery, and therefore when a user mounts the ultrasonic module 11, the user only needs to mount one component, to avoid a problem of a fault caused by low mounting precision when the plurality of probes 111 and 112 are independently mounted, thereby greatly improving user experience.

As shown in FIG. 5A, FIG. 5B, and FIG. 5C, in this embodiment, a secondary cavity 32 in which the ultrasonic module 11 is mounted on the housing 3 is located on an upper part of the housing 3 and has a shallow groove shape. Because the ultrasonic module 11 needs to be disposed in a manner of protruding from the housing 3, the secondary cavity 32 in which the ultrasonic module 11 is mounted does not need a very large accommodation space but only an accommodation space that can accommodate a terminal connected to the ultrasonic module 11.

In other words, the secondary cavity described in this embodiment of the present invention includes a shallow-groove-shaped accommodation space on the housing 3, and specifically, includes an accommodation space that is depressed inward relative to the housing around. Alternatively, the accommodation space may be formed by a cover plate or a housing of a functional module.

In this embodiment, a decorative cover 114 is disposed for the secondary cavity 32 in which the ultrasonic module 11 is mounted, to shield and fix the terminal connected to the ultrasonic module 11. When the ultrasonic module 11 is mounted to the housing 3, the decorative cover 114 is taken off, the terminal of the ultrasonic module 11 is docked with a reserved terminal on the automatic mower 1, the support 113 of the ultrasonic module is fixed onto the housing 3, for example by using a screw, and the ultrasonic module 11 shields an opening of a groove of the housing 3 formed by the secondary cavity 32.

In this embodiment, the ultrasonic module 11 also includes a control circuit, capable of processing at least some signals received by the ultrasonic probes 111 and 112, and transmitting the processed signals through a communications terminal to the main control board 9. Division of signal processing between the respective functional modules and the main control board is further described below. It can be understood that the respective functional modules not only can locally process data on the modules and transmit control signals to the main control board based on processing results, but also can transmit data to the main control board for processing by the main control board. This depends on a data processing load and a processing capability of each functional module, and a processing load and a processing capability of the main control board.

In any of the embodiments of the invention, a cavity or sub-cavity as described herein may be designed to be capable of mounting different modules, e.g. different sensing modules. Thus in an automatic working system, different modules may be designed to be received interchangeably in the same cavity. In this embodiment, a position for mounting the ultrasonic module may alternatively be used to mount a camera, laser radar, or the like, provided that interfaces have a uniform form. There are similar requirements on mounting positions of these modules. In other words, different functional modules may be selectively mounted to a same interface of the housing. A functional module may be selected by a user based on a demand and a working scenario of the automatic mower. It can be understood that in addition to detecting a boundary of a working area or an obstacle within a working area, a sensor, for example a camera, by photographing images, can also implement functions such as monitoring, patrolling, and security maintenance. According to some embodiments of the invention the control module may monitor the working of the device, for example the use of the functional modules, and a functional module may be automatically recommended to the user. This is described in more detail with reference to FIG. 10.

In another embodiment of the present invention, the boundary detection module may include a land surface boundary detection module, configured to determine, by detecting a target or a signal on the land surface or near the land surface, whether a boundary is detected. Specifically, the boundary detection module may include a magnetic detection module, configured to detect a magnetic marker arranged in a garden. Thus any of the self-moving devices described herein may comprise a cavity for one or more removable sensing modules at least one of which comprises a sensor for sensing a static magnetic field, such as the magnetic detection module 13 described elsewhere herein. The ability, in a self-moving device, to detect static magnetic fields may be additional to detection of varying magnetic fields using a boundary inductive sensor as described elsewhere herein. However, the detection of both static and varying magnetic fields is not essential in all embodiments of the invention. As described elsewhere herein a sensor for a static magnetic field may be disposed on a lower surface of the housing and/or facing the working surface. Additionally or alternatively, a boundary detection module may include a capacitance detection module, configured to detect grassland and non-grassland. In this embodiment, a magnetic detection module is used as an example. The magnetic detection module includes a geomagnetic sensor, a Hall sensor, or the like. In this embodiment, the magnetic detection module detects a magnetic strip arranged in a garden. By means of the foregoing solution, a user does not need to enclose, by using an "active" or energized boundary line, an island area that does not need to be cut, for example, a flowerbed. Once an island is changed, the boundary line needs to be cut off to be adjusted again. This is troublesome and has a hidden risk of a poor signal. The magnetic strip is a passive marker and can be adjusted and changed at will, and therefore is convenient in operation.

Figure 6A:
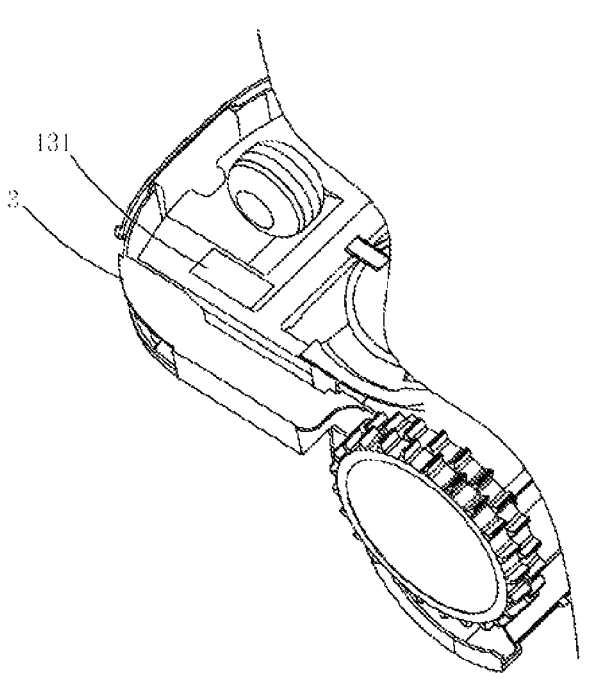
FIG. 6A and FIG. 6B are schematic diagrams of mounting of a magnetic detection module according to an embodiment of the present invention.
Figure 6B:
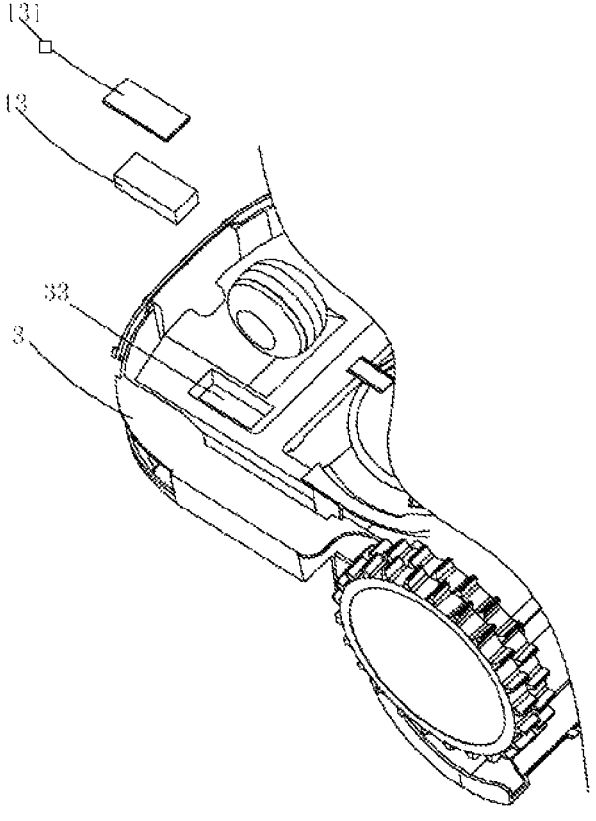

FIG. 6A and FIG. 6B are schematic diagrams of mounting of a magnetic detection module. FIG. 6A and FIG. 6B are partial perspective views of the automatic mower 1 from below. As shown in FIG. 6A and FIG. 6B, in this embodiment, a position reserved on the housing 3 of the automatic mower for the magnetic detection module 13 is located at a lower part of the housing 3, to help the magnetic detection module 13 sense a magnetic strip signal. Specifically, a mounting position of the magnetic detection module 13 meets a requirement of no shielding of a metal object below, to prevent a signal from being interfered with. In this embodiment, the magnetic detection module 13 not only is mounted on the lower part of the housing 3, but also is mounted on the front part of the housing 3, to help the magnetic detection module 13 detect, in a timely manner, a magnetic strip arranged in a direction along which the automatic mower 1 moves, and take an avoidance measure in a timely manner. In this embodiment, a cover plate 131 is disposed for a secondary cavity 33 in which the magnetic detection module 13 is mounted, and before and after the magnetic detection module 13 is mounted, the secondary cavity 33 is covered by the cover plate 131, to prevent water vapor or dirt from entering the secondary cavity 33. It can be understood that when the automatic mower 1 can recognize a working area in a manner other than detecting a boundary line, a boundary inductor may alternatively be an optional functional module, and is mounted at a similar position on the lower part of the housing 3. In a possible embodiment, a user can choose to configure a high-precision positioning module, for example a high precision satellite positioning module, or a boundary inductance module for the automatic mower 1. To be specific, a working area recognition function may be implemented by selecting different functional modules. If a high-precision positioning module is configured for the automatic mower 1, a user does not need to arrange a boundary line. Operation is simple, and the beauty of an appearance of the garden can be maintained. However, a high-precision positioning module is priced high. If a boundary inductance module is configured for the automatic mower 1, a user needs to arrange a boundary line, but the costs are relatively low. Such a manner of selectively configuring a functional module by a user fully embodies characteristics of user customization.

Certainly, the capacitance detection module or the like may alternatively be mounted at a similar position on the housing 3. A capacitance probe is preferably exposed out of the housing 3, to improve the sensitivity of the capacitance probe.

In another embodiment of the present invention, the functional modules include a user interaction module. The user interaction module may be a voice recognition module, a speech recognition module, a gesture recognition module, a manual input module, or the like. In this embodiment, descriptions are provided by using a voice recognition module as an example.

Figure 7:
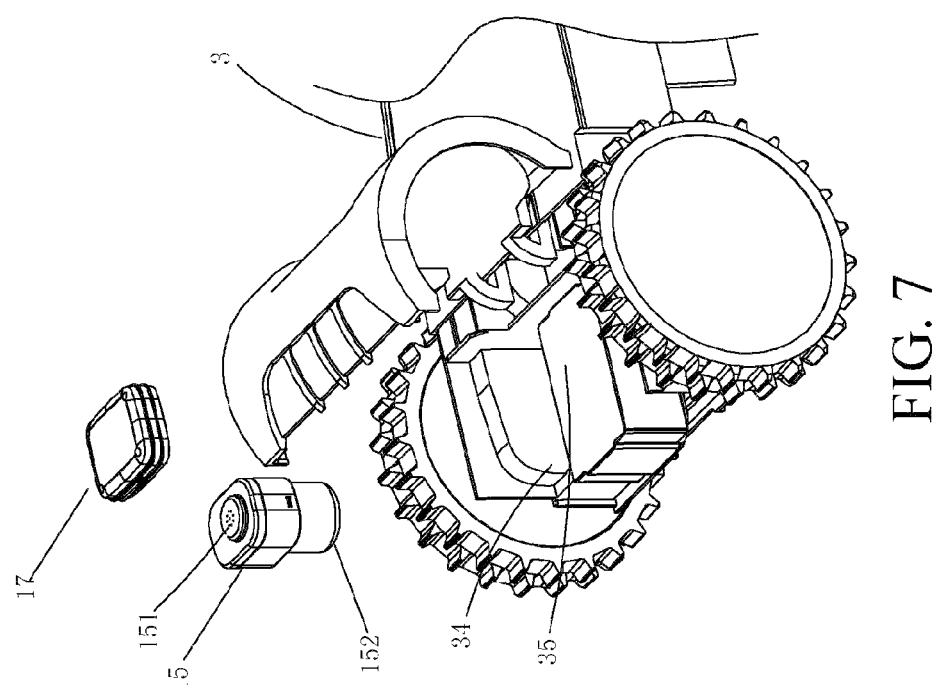
FIG. 7 is a schematic diagram of a voice recognition module and an anti-theft functional module according to an embodiment of the present invention before mounting.
Figure 8:
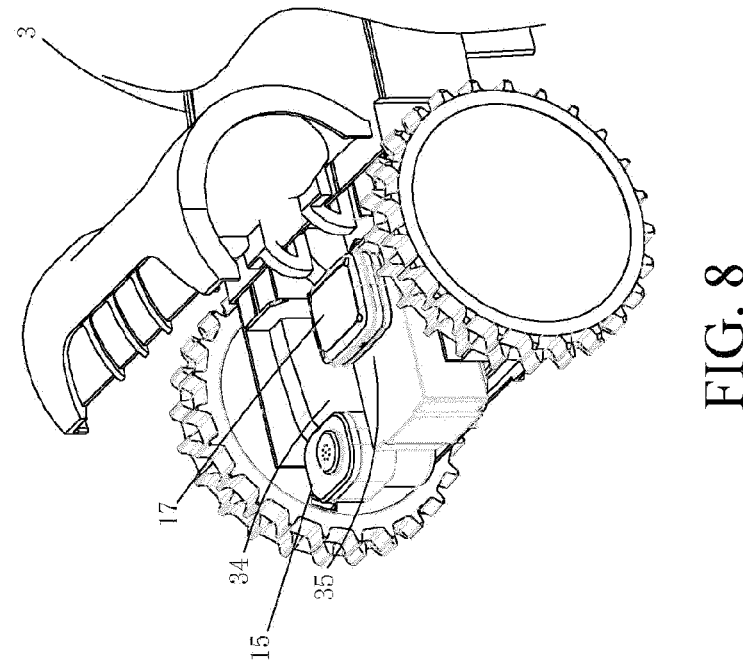
FIG. 8 is a schematic diagram of a voice recognition module and an anti-theft functional module according to an embodiment of the present invention after mounting.

Refer to FIG. 1, FIG. 7, and FIG. 8, FIG. 7 and FIG. 8 are schematic diagrams of the voice recognition module and an anti-theft functional module to be described below before and after mounting. As shown in FIG. 1, a voice recognition module 15 includes a microphone 151 and further includes a speaker 152. The microphone 151 is configured to receive a voice signal of a user, and the speaker 152 is configured to transmit a feedback signal, to interact with the user. The voice recognition module simplifies human-machine inter-action and can prompt a user to perform an operation, thereby facilitating understanding of a user and helping a user, particularly an elderly user, set and operate the machine. In this embodiment, a position reserved on the housing 3 of the automatic mower for the voice recognition module 15 is located on a rear part of the housing 3, to facilitate a user to perform voice communication. In addition, it is easy for the microphone 151 to receive a voice instruction of the user. Specifically, a mounting position of the microphone 151 is close to an upper surface of the housing 3. The microphone 151 not only can be disposed on an upper cover of the housing 3 in a protruding manner, but also can be disposed at a position below the upper cover and close to the upper surface, so that a voice instruction received by the microphone 151 is more accurate and reliable and has a higher recognition rate. Specifically, a small hole is provided above the microphone 151 on a housing of the voice recognition module 15, for voice information to enter the microphone 151. The speaker 152 is disposed downward, and faces an area below the housing 3. Sound is transmitted to the ground and then, reflected to the human ears. In an embodiment, the speaker may be set to be open, to help propagation of the sound. Specifically, the voice recognition module 15 may be mounted from the bottom, and in this case, a corresponding secondary cavity 34 faces downward and is depressed toward the upper part of the housing 3. The voice recognition module 15 may alternatively be mounted from the top, and in this case, a corresponding secondary cavity 34 faces upward and is depressed toward the lower part of the housing 3. This is not limited herein.

When the voice recognition module 15 is not sealed in the housing 3 of the automatic mower, a protection rating of the voice recognition module 15 needs to meet ingress protec-tion "IP" rating IP67. Similarly, because the ultrasonic module 11 described above is disposed in a manner of protruding from the housing 3, the ultrasonic module 11 also has a relatively high requirement on a protection rating. For example, the protection rating needs to meet IP67. However, for a functional module sealed in the housing 3 of the automatic mower, for example, the magnetic detection mod-ule 13 described above, the protection rating only needs to reach IPX4.

According to any embodiments of the invention, a voice or speech recognition module need not require internet, e.g. cellular, communication. In other words, it may be operable "offline". Thus instead of, or in addition to, full speech and/or voice recognition capability which may be available online, for example from a voice and/or speech recognition server, a voice or speech recognition module may be pro-grammed to recognise a limited number of words, e.g. commands, by simple comparison with a representative sample of recordings of speech of the same words. This can be achieved using a suitably programmed processor and associated memory forming part of a voice or speech recognition module or the necessary signal recognition may be carried out at the control module. This means that the device can be operational very quickly without requiring mobile connectivity, which may again be beneficial to the elderly or those in remote locations where connectivity is less reliable. It may not be able to distinguish one voice from another as may be possible with voice recognition.

Other user interaction modules may be mounted at a similar position on the housing 3.

In another embodiment of the present invention, the functional modules include a communications module, and specifically include one or more of a cellular communica-tions unit, a Wi-Fi module, a Bluetooth module, a Sub 1G radio frequency module, or the like.

In a specific embodiment, a cellular communications module is combined with a satellite, e.g. GPS, positioning module to form an anti-theft functional module 17. Thus in any embodiments of the invention a communications mod-ule and a positioning module may be mounted singly or together in the same cavity, which may be in the top of the housing, or they may be provided in a single module which may be configured to serve as an anti-theft module. Spe-cifically, the cellular communications module may be a 2G/3G/4G/5G module, and the satellite positioning module may be a GPS module. The GPS module herein particularly refers to a low-precision GPS module. When the anti-theft functional module 17 is mounted on the automatic mower 1, the satellite positioning module may determine a position of the automatic mower 1, and send the position of the auto-matic mower 1 to a remote device through the cellular communications module, for example, to a server or a user terminal for a user to query or for informing a user of an exception. This is illustrated schematically in more detail in FIG. 10.

In any of the embodiments of the invention described herein, a radio frequency module may be provided which is configured to communicate with a remote server, for example via an internet gateway such as a router at a user's premises. This may be useful for example where the user's Wi-Fi coverage does not include the whole of the working area. The radio frequency module may operate at a sub 1G frequency. The radio frequency module or any other com-munications module may be accommodated at any suitable location on the device. One possible location is in the cavity 35, for example a radio frequency module, or a Bluetooth module or a Wi-Fi module may be provided instead of the anti-theft module 17. Alternatively separate locations and/or cavities may be provided for different communications modules. Any of a radio frequency module or a Bluetooth module or a Wi-Fi module may have the same appearance as the illustrated anti-theft module.

Figure 10:
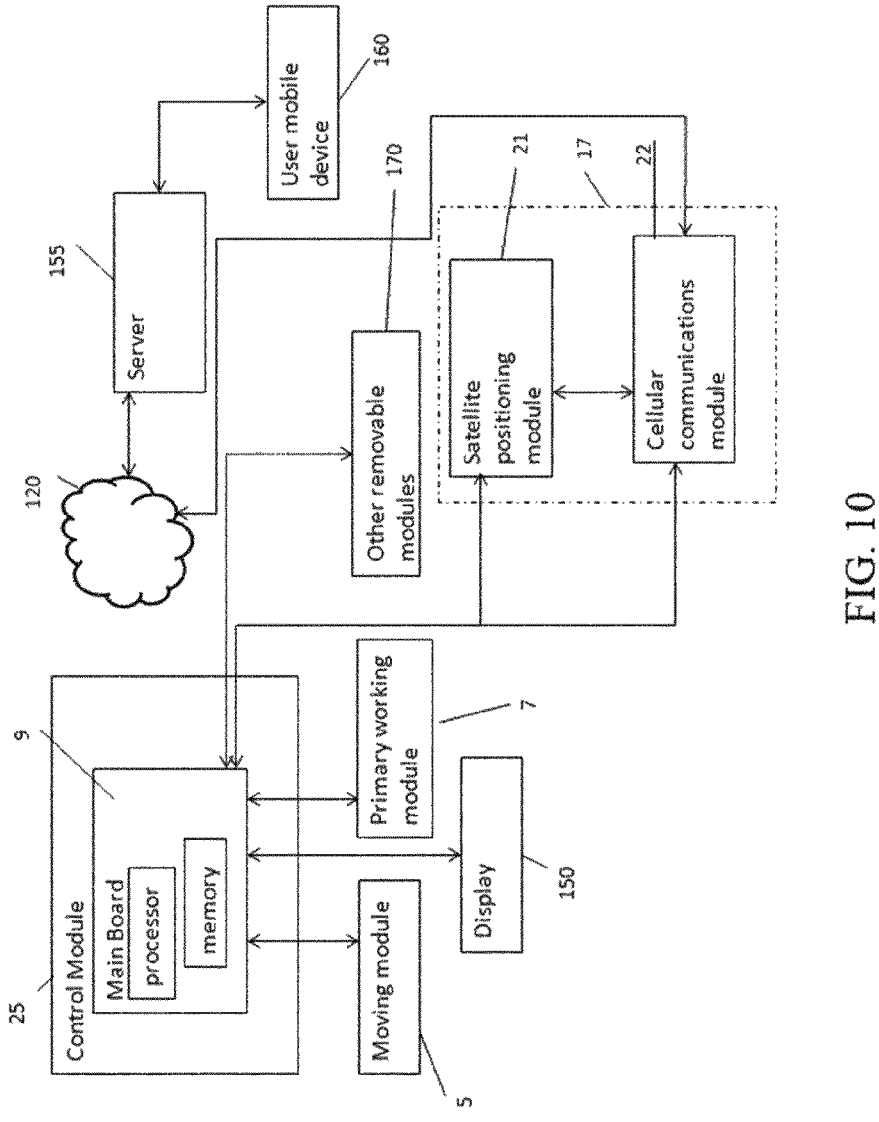
FIG. 10 is a schematic diagram similar to FIG. 9 showing a control module communicating with a server and a user mobile device according to some embodiments of the invention.

In FIG. 10, various modules as described previously herein communicate with the control module 25, optionally comprising the main board 9, a processor and memory. The control module 25 controls the operation of the moving module 5 and the primary working module 7 based on signals from one or more sensing modules, some of which are collectively indicated as "other removable modules" 170, and optionally based on location signals from the satellite positioning module 21. The control module 25 is able to communicate with a server 155 or user terminal 160 using the cellular communications module 22, via the inter-net 120. Alternatively communication with the server 155 may be via Wi-Fi as known to those skilled in art and not shown in detail in FIG. 10 for simplicity. According to some embodiments of the invention, radio communication, for example using sub 1G frequency, may be used instead of

US 12,645,218 B2

17

Figure 11:
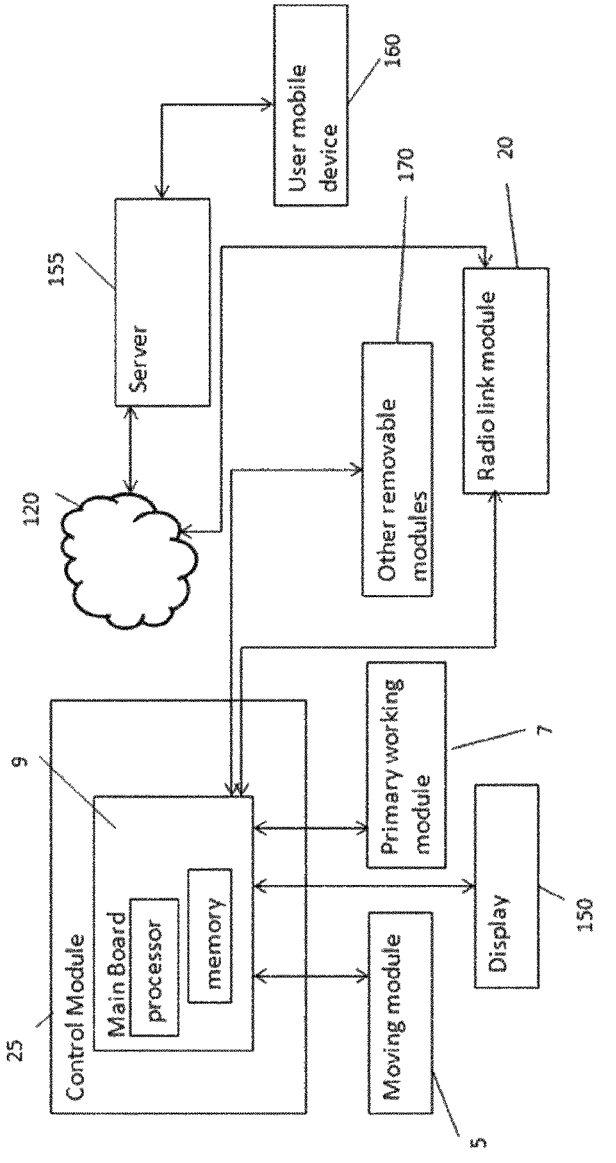
FIG. 11 is a schematic diagram similar to FIG. 10 showing a control module communicating with a server and a user mobile device according to some embodiments of the invention using a radio link.

Wi-Fi or Bluetooth. FIG. 11 is a schematic diagram similar to FIG. 10 illustrating how a radio module may be used for communication with a remote server via the internet. It will be appreciated from the foregoing that the server 155 may act as an "internet of things" or IoT platform and the self-moving device may behave as an IoT device. As noted elsewhere herein, at least some modules such as the sensing and communication modules may be configured to send regular signals, e.g. messages, to the control module 25 to confirm their presence. The control module may determined from the absence of any message for a predetermined amount of time that the module is no longer present.

Messages exchanged between the device, e.g. the control module 25, and the server 150 may use a particular bit field format to indicate to the server which modules are installed. This may be a binary indication in which one state indicates that a module is present and the other indicates that the module is absent or possibly defective.

This solution, e.g. use of GPS positioning, is suitable for a user whose garden has no fence or has a very large area, and can position the machine, and facilitate anti-theft tracking. The use of mobile communication, such as cellular, or radio communication as described elsewhere herein is suitable for interconnection and communication between the machine and a user at a place that is not within Wi-Fi coverage. Any kind of communication with a remote server is suitable for a remote program modification, e.g. update. Different areas in Europe and America are different in terms of signal coverage, and a combination of 2G+4G NBIoT technologies can achieve full coverage of signals. In order for an automatic mower on which the functional module is mounted to implement a corresponding function, a user may preset an "electronic fence" for the automatic mower, for example to set that the automatic mower cannot go beyond an area defined by coordinates of the electronic fence. Then, during operation, if the automatic mower detects through the satellite positioning module that the automatic mower goes beyond the area defined by the electronic fence, the automatic mower may triggers a cellular communications module 22 to send alarm information to the remote device, e.g. mobile device 160, to inform a user of an exception. Meanwhile, the machine can lock at least some functions, for example the control module 25 may be configured to cause operation of the primary working module 7 to stop, and/or "lock" the moving module. After receiving the alarm information, if the user confirms that the machine is stolen, the user may track a position of the machine by using the satellite positioning module 21; or if the user confirms false triggering, the machine can be unlocked to enable the machine to resume the operation.

With reference to FIG. 1, FIG. 7, and FIG. 8, in this embodiment, a position reserved on the housing 3 of the automatic mower for the anti-theft functional module 17 is close to the upper surface of the housing 3, to help an antenna of the satellite positioning module 21 to receive a satellite signal and also help the cellular communications module send/receive information. Specifically, there is no metal shield above the anti-theft functional module 17. Particularly, there is no metal shield in a range of 120 degrees above the antenna of the satellite positioning module. The functional module 17 may be disposed on the front part of the housing 3 or on the rear part of the housing 3, and may be mounted from the bottom or from the top. No limitation is imposed. In this embodiment, the secondary cavity in which the functional module is mounted is shielded by the cover plate. On the one hand, water vapor and dirt are prevented from entering from the outside. On the other hand, the cover plate fixes and tightly compresses the functional module.

In another embodiment, whether the automatic mower is stolen may alternatively be determined by determining whether a cellular network base station to which the automatic mower is connected changes.

Other communications modules may be mounted at a similar position on the housing 3.

In another embodiment of the present invention, the functional modules include an auxiliary working module (not shown), and specifically, may include a trimming module such as a grass mowing apparatus. The grass mowing apparatus performs grass mowing work by using a flexible cutting element. A position reserved on the housing of the automatic mower for the grass mowing apparatus is located on the lower part of the housing and may be located on a side part of the housing, including an inner side and an outer side. The side part may be a front side or left and right sides. The grass mowing apparatus may be directly powered by the battery pack or may be powered by the main control board. The grass mowing apparatus may be equipped with an independent driving motor or may be drive by a motor of the automatic mower through a transmission mechanism. The grass mowing apparatus can mow edges of a lawn, thereby avoiding secondary work.

In another embodiment of the present invention, the functional modules include a positioning module (not shown), particularly, a high-precision positioning module herein. The positioning module is mounted on the automatic mower to recognize a working area, thereby avoiding a trouble in laying a boundary line, and can further plan a path by using a positioning function. The functional module is particularly suitable for a scenario in which a lawn has a relatively large area. Specifically, the positioning module may be a satellite positioning module such as a differential global positioning system "DGPS" module, a real time kinematic "RTK" module, or an ARTK module, or may be a beacon positioning module such as an ultrasonic beacon positioning module, or an ultra wide band "UWB" beacon positioning module. A position reserved on the housing of the automatic mower for the positioning module is located on the upper part of the housing, particularly, at the top of the housing. In particular, an antenna is directed upward to help the antenna receive signal. When the positioning module is mounted on the housing, the positioning module may protrude from the housing around and cover an opening of a groove of the housing formed by the secondary cavity.

In another embodiment of the present invention, the functional modules may include an environment detection sensor (not shown), and specifically, include a grass height detection sensor, a soil detection sensor, a color sensor, an illumination sensor, a rainfall sensor, and the like. The environment detection sensor may be flexibly mounted at different positions based on different detected objects. For example, the grass height detection sensor and the soil detection sensor may be mounted at the bottom of the housing, the color sensor may be mounted on the front part or at the bottom of the housing, the illumination sensor may be mounted on the upper part or the front part of the housing, and the rainfall sensor may be mounted on the upper part or the rear part of the housing. Different environment detection sensors may be selected based on specific working scenarios of the automatic mower.

As described above, different functional modules may be selectively mounted/connected to a same mounting position/interface on the automatic mower. Therefore, the foregoing functional modules may have independent mounting positions/interfaces or share one mounting position/interface. Different functional modules may alternatively share one secondary cavity when having different mounting positions/interfaces.

In the foregoing embodiments, for the respective functional modules, protection on a host and the functional modules of the automatic mower may be designed differently. For example, waterproof design needs to be made on the host of the automatic mower and interfaces on the respective functional modules. The waterproof design differs based on different waterproof requirements of the modules. In simple waterproofing, the opening of the groove of the housing formed by the secondary cavity is covered by disposing a protection cover for the secondary cavity or using the functional module as a protection cover. When the functional module has a further waterproof requirement, enhancement of a waterproofing function in a manner such as adding a seal strip may be taken into consideration. Further, when a functional module generates a large amount of heat during work, to ensure that the functional module works normally, heat dissipation for the functional module or the secondary cavity in which the functional module is mounted needs to be designed. For example, a phase-change material, a cooling system, or the like is disposed. When the work of the functional module is greatly affected by a temperature, thermal insulation may need to be designed for the functional module or the secondary cavity in which the functional module is mounted, for example, by mounting a heat insulation sheet or a temperature adjustment unit.

The foregoing functional modules are all independent modules, including a module housing and elements such as a sensor and a control circuit that are disposed in the module housing, and further including a second interface matching the housing of the automatic mower including a second mechanical interface and a second conduction interface. The second conduction interface includes a communications interface and a power interface. When a functional module is mounted on the housing of the automatic mower by using a screw, the functional module is provided with a mounting screw.

When the respective functional modules are mounted on the automatic mower 1, to implement functions of the functional modules by the automatic mower 1, software of the automatic mower 1 needs to be compatible with the functions of the functional modules. In an embodiment, software of the main control board 9 is compatible with the respective functional modules.

In a specific embodiment, the main control board 9 pre-stores software corresponding to the respective functional modules, such as drivers. When the functional modules are mounted to the automatic mower 1, particularly, when the functional modules are in communication connection with the main control board 9, the respective functional modules can enter a working state. The main control board 9 may invoke functions of the respective functional modules, control the respective functional modules to work, receive data collected by the functional modules and/or control signals, and control movement and work of the automatic mower 1 based on the data and/or control signals from the functional modules.

In another specific embodiment, when a functional module is mounted to the automatic mower 1, particularly, when the functional module is in communication connection with the control module or main control board 9, the control module or main control board 9 may be triggered to modify software that is already installed, and the main control board 9 in response to the trigger may obtain software corresponding to the functional module. In other words, the control module, e.g. a processor at the control module, may be programmed with basic software to be modified depending on which removable modules are mounted on the device. The main control board 9 may obtain update or modification software remotely through the communications module, for example from a remote server 155. Alternatively, the respective functional modules may pre-store software. When a functional module is docked with the automatic mower 1, the main control board 9 may obtain update or modification software through a communications interface between the functional module and the automatic mower 1. The modification software, also described herein as instructions for implementation in a processor or control module, may comprise a software module corresponding to a respective removable module of the device.

Figure 9:
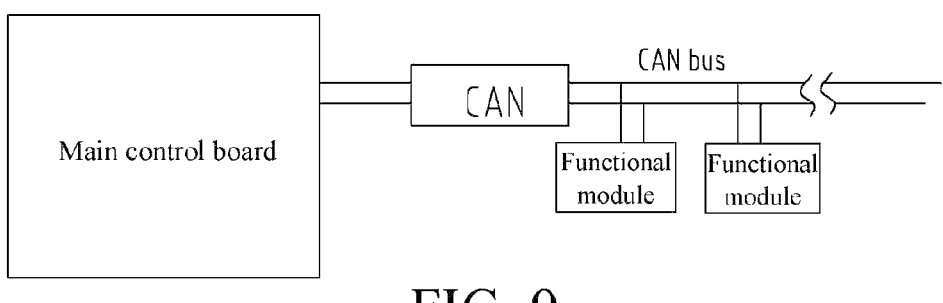
FIG. 9 is a schematic diagram of circuit connection between a main control board and respective functional modules according to an embodiment of the present invention.

FIG. 9 is a schematic diagram of circuit connection between a main control board 9 and respective functional modules according to an embodiment. A control module having control functions and not necessarily comprising a main control board may operate in the same way as the main control board described with reference to FIG. 9. The respective functional modules may be connected to the main control board 9 through a CAN bus or using any other suitable communication technology or components. Communication protocols of the respective functional modules may be consistent with a communication protocol of the main control board. Each functional module may have a unique address. When detecting a unique address of a functional module, that is, determining that the functional module has been connected, the main control board may automatically start the functional module. The main control board may determine, based on a software version of the functional module, a version status and if necessary automatically perform an update. When a functional module is used on an automatic mower for the first time, a machine address is recorded. When recognizing a machine next time, if the functional module determines that the machine is not the machine to which the functional module is connected for the first time, the functional module cannot be used, so that the functional module can be prevented from being stolen.

In any of the embodiments described herein, firmware and/or communication to and from the control module 25 may be encrypted and/or signed. This is useful since, depending on what modules are installed, software upgrades may be performed over the air, and even communications over wires within the device are vulnerable to interception. For example a cryptographic hash function such as HMAC may be used to sign information exchanged between the control module 25 and other modules and a known encryption scheme such as XXTEA may be used. Communication, for example over the CAN bus, may be according to any known standard or protocol, such as ISO TP as is used in CAN bus communications.

Figure 12:
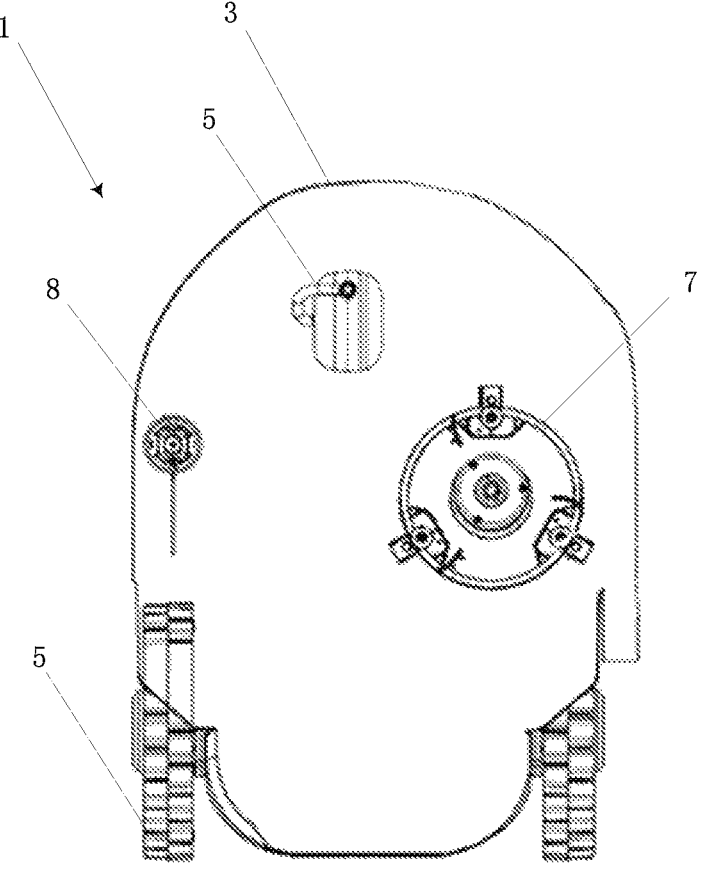
FIG. 12 is an elevation from below of a self-moving device according to some embodiments of the invention.

FIG. 12 shows a possible arrangement of modules on the underside of the housing according to some embodiments of the invention. In the embodiment of FIG. 11, the device comprises three wheels, two at the rear and one at the front, which may be considered to be separate moving modules. A device according to the invention may comprise any number of moving modules which need not comprise wheels. A primary working module 7 comprising in this embodiment a rotary cutting device is mounted on the underside of the housing 3. In the embodiment of FIG. 12 an auxiliary working module 8 is mounted on the underside of the housing and comprises a trimming device which may be used for example to trim the edges of an area of grass. An auxiliary working module such as an edge trimming device may be provided in any of the embodiments described herein, and may for example be mounted towards one side of the housing, for example on a side wall or off centre on the underside of the housing or any other sideward location. In any of the embodiments of the invention, the primary working module may be mounted off center, for example as shown in FIG. 12. For example, suppose a working module 8 in the form of a grass trimming apparatus is mounted on an automatic mower, a first interface of the automatic mower is connected to a second interface of the grass trimming apparatus in a matching manner, and terminals are connected to each other. A control module 25, e.g. at a main control board 9 of the automatic mower may detect an address of the grass trimming apparatus, determine that the grass trimming apparatus has been connected, and automatically update software, to get the grass trimming apparatus ready. During working, when the automatic mower enters a grass trimming mode, the main control board sends a control signal to the grass trimming apparatus, to instruct the grass trimming apparatus to enter a working state, and the grass trimming apparatus starts to work. The grass trimming apparatus may further include a sensor detecting a surrounding environment. When the sensor, or a separate removable sensing module 170 as described elsewhere herein, detects an exception around, for example, detects that a creature approaches, the sensor may transmit a detection signal to the main control board 9. The main control board 9 accordingly may send a work stopping signal to the grass trimming apparatus 7, and then the grass trimming apparatus stops working. This is an example of a control module controlling operation of a removable module.

Compatibility between the automatic mower and functional modules is described above by only using a grass trimming apparatus as an example. Other functional modules may be similar thereto. Details are not described again. It can be understood that data collected by a functional module not only can be processed in the functional module, but also can be processed in the main control board, and may alternatively be partially processed in the functional module and partially processed in the main control board. No limitation is imposed.

As noted elsewhere herein, in any of the embodiments of the invention the modules may be positioned according to their function and/or requirement for protection. Some non-limiting example positions for some of the modules, one or more of which may be used in any embodiments of the invention are as follows:

Magnetic detection module: at the bottom of the device, for example on the underside of the housing, with at least one at front or back, distant from a magnetic signal source (e.g. motor), not interfering with wheels.

Ultrasonic module: top or lateral position, inside is also possible.

Voice control module: microphone toward outside, preferably upward near the top, backward or lateral is also possible, having a straight path (no longer than several millimeters) to the outside; speaker toward outside, preferably toward the bottom, and/or in a lateral position.

Anti-theft: any position, not covered by metals.

In an embodiment, to reduce power consumption of an entire system, a functional module is powered intermittently. Specifically, when a functional module does not work, the functional module is enabled to enter a sleep state, that is, a low-power-consumption state. When the functional module needs to work, the main control board activates the functional module through the CAN bus.

On the automatic mower in the foregoing embodiments, different functional modules may be selectively mounted, so that a same automatic mower having a basic function may implement different performance by being selectively configured with different functional modules. An upgrade of the automatic mower is simple, and customization can be achieved.

The foregoing design on the automatic mower and functional modules brings a new mode to sales of the automatic mower and user experience. That is, when manufacturers sell products, the manufacturers no longer directly sell automatic mowers integrated with various functions, and instead, a host and respective functional modules of an automatic mower are sold separately. The functional module may be independently packaged as an accessory. Correspondingly, during production, factories make production plans based on demands for a host and accessories of an automatic mower separately.

For a user, when purchasing an automatic mower, the user may purchase an accessory voluntarily. Specifically, the user may select a demanded accessory based on a working condition of the garden of the user. For example, a high-precision positioning module and the like may be selected for a garden having a large area. The user may further purchase the host and the respective accessories of the automatic mower separately. For example, after purchasing a host of an automatic mower, if the user finds a demand for an accessory, the user may further purchase the accessory. When a working condition of a garden changes, the user may purchase a new accessory or may purchase a new accessory for upgrading the automatic mower. There are more options for users. For manufacturers, such a mode can prolong a sales season because after a user purchase a host, the user is also like to further purchase an accessory. Furthermore the user may purchase one or more modules according to the operating conditions in which a device is to work.

In most cases, an accessory is mounted by a user after the user purchases the accessory. Moreover, the foregoing automatic mower and the functional module are designed to be quickly mounted/detached, to help operation by a user.

Manufacturers may further recommend an accessory for a user by using an app of an automatic mower. The app may collect working data of the automatic mower of the user, to determine a working condition of a garden of the user, and correspondingly recommend an accessory that a user may need. The app may alternatively determine service lives of respective accessories by monitoring working parameters of the respective accessories to prompt the user to perform replacement in a timely manner. The app may alternatively inform the user of fault information of the automatic mower or the accessory, to perform self-diagnosis. The app may be installed in the control module and be accessible to the user via an interface such as the display 150. Alternatively the app may be installed in a user device 160.

Thus, in any of the embodiments of device or system described herein, the control module may be configured, for example by suitable programming of a processor comprised in the control module, to analyse the use of the removable modules and provide guidance to a user in the use of the removable modules.

Thus, in another aspect, the invention provides a self-moving device comprising: a housing, a moving module drivable to cause the device to move, a plurality of cavities in the housing for receiving respective removable modules, a working module configured to perform a work task, a control module for example comprising a processor and a memory and being configured to control the moving module and at least the working module, and a communication system connecting the control module to the moving module and to the removable modules when mounted on the housing, wherein the control module is configured to monitor the operation of the device to provide guidance to a user in the use of the removable modules. The monitoring may comprise monitoring the use of the removable modules and/or signals from one or more sensor modules on the device.

The guidance may comprise an indication as to whether or not a module is correctly received in a cavity, for example whether the device is correctly seated mechanically, whether it is properly electrically connected, or whether it is in the right cavity.

The guidance may be provided on the device itself or on a separate e.g. user mobile, device. In either case the guidance may be visible and/or audible. The guidance may be generated at the control module or the user device for example using an app. Therefore some embodiments of the invention provide a computer implemented method comprising: receiving data relating to the operation of a system comprising a self-moving device, and a plurality of modules which may be mounted on the device, wherein the data relates to the mounting and removal of the removable modules on the device and the method comprises analysing the data to provide guidance for a user in the use of the removable modules. The method could be implemented at various locations, for example at the device control module at a remote server, or at a user device such as but not limited to a smart phone, tablet or computer. Similarly some embodiments of the invention provide a computer readable medium comprising instructions which when implemented in a processor of any computing system such as but not limited to a computing system in a control module or a server or a user device, cause the module to implement any of the methods described herein.

As noted elsewhere herein, the device may comprise a wireless communication module, optionally removable, for communication with a remote server such as server 155 of FIG. 10. The guidance may be communicated to the server 155 and relayed by the server to a user mobile or other device 160, for example via a dedicated app on the user device 160. Alternatively the guidance may be communicated to the user via a screen or other display 150 on the device 1. The guidance may comprise a recommendation to use an additional or alternative removable module. The provision of guidance may comprise prompting the user to provide information relating to the use of one or more of the removable modules, in response to the detection of a condition such as the mower ceasing to operate, for use in providing the guidance.

According to some embodiments of the invention, a "connection history" for the removable modules may be compiled, for example at the memory of the control module, and this may be used in the provision of guidance to the user. For example if the user uses a module repeatedly for short time this may indicate that the user is having some difficulty with it.

Any of the removable modules may be configured to send a periodic signal to the control module 25 whereby the control module is made aware that the removable module is present on the device. The control module may then interpret the absence of the periodic signal as meaning that the removable module is not present. In other embodiments the control module may send requests to the removable module to confirm their presence or absence.

Guidance provided according to some embodiments of the invention may include a recommendation to purchase or use a different module from those currently installed on the device. For example, for a device operating with short range radio communication such as Wi-Fi, the communications module or the control module may detect that the Wi-Fi reception is not continuous throughout the whole working area, in which case the use of a different wireless communication module may be suggested, for example a radio module as described elsewhere herein for extended area reception, or a cellular communications module.

Another possibility is that if the device frequently bumps into objects, evident for example from frequent stops or from camera information, the use of an anti-collision, e.g. ultrasonic module may be recommended. The recommendation may be generated after a predetermined or threshold number or rate (e.g. per unit time) of collisions has occurred.

The control module 25 may be configured to determine a total mounting time for one of more of the removable modules and wherein the guidance comprises an alert which is generated when the total mounting time of one of the removable modules exceeds a predetermined time, for example because the module needs to be replaced.

A light sensor may be provided on a device in any of the embodiments described herein, for example in a removable module. The control module 25 may then assist or guide the user in a choice of removable module, such as camera or laser sensing, based on the light levels in the working environment.

The foregoing embodiments merely express several implementations of the present invention in detail, and therefore cannot be construed as a limitation to the patent scope of the present invention. It should be noted that persons of ordinary skill in the art may make various changes and improvements without departing from the ideas of the present invention, which shall all fall within the protection scope of the present invention. Therefore, the protection scope of the patent of the present invention shall be subject to the claims.

What is claimed is:

1. A self-moving device, comprising:
a housing, in which a primary cavity and at least one secondary cavity are formed, wherein the at least one secondary cavity is isolated from the primary cavity, and at least one first interface corresponds to the at least one secondary cavity;
a control module, disposed in the primary cavity, and configured to:
control a moving module to actuate the self-moving device to move,
control a primary working module to perform a work task,
detect a type of at least one functional module, the at least one functional module comprising at least one sensing module, and
modify a control program according to the type of the at least one functional module to obtain a modified control program, the modified control program being used for controlling the moving module or the primary working module based on sensing data obtained from the at least one functional module; and
the at least one functional module, comprising a second interface configured to mount to the at least one secondary cavity, such that the at least one first interface is connected to the second interface, wherein the at least one secondary cavity is configured to mount the at least one functional module different from the moving module and the primary working module, and the at least one functional module is removable from the housing.

2. The self-moving device of claim 1, wherein the control module comprises a main control board, and the at least one secondary cavity has an accommodation space that is configured to accommodate a terminal of a lead wire, wherein the lead wire extends from the main control board to the at least one functional module.

3. The self-moving device of claim 1, wherein the at least one functional module further comprises a communication module, or an auxiliary working module.

4. A self-moving device, comprising:
a housing, in which a primary cavity and at least one secondary cavity are formed, wherein the at least one secondary cavity is isolated from the primary cavity;
a moving module, mounted on the housing, and configured to actuate the self-moving device to move;
a primary working module, mounted on the housing, and configured to perform a work task;
a control module, disposed in the primary cavity, and configured to:
control the moving module to actuate the self-moving device to move,
control the primary working module to perform the work task,
detect a type of at least one functional module in response to the at least one functional module being mounted on the self-moving device, the at least one functional module comprising at least one sensing module, and
modify a control program according to the type of the at least one functional module to obtain a modified control program, the modified control program being used for controlling the moving module or the primary working module based on sensing data obtained from the at least one functional module; and
the at least one secondary cavity is configured to mount the at least one functional module different from the moving module and the primary working module, wherein the at least one functional module is removable from the housing.

5. The self-moving device of claim 4, wherein:
the control module comprises a main control board,
the at least one secondary cavity has a hole,
a lead wire is led out from the main control board, and passes through the hole and extends to the at least one secondary cavity, and
the lead wire is configured to detachably connect to the functional module.

6. The self-moving device of claim 5, a seal strip is disposed around the hole.

7. The self-moving device of claim 5, wherein the at least one secondary cavity has an accommodation space that is configured to accommodate a terminal of the lead wire and a terminal of the at least one functional module.

8. The self-moving device of claim 4, a lead wire is led out from the primary cavity, wherein the lead wire is configured to detachably connect to the at least one functional module.

9. The self-moving device of claim 4, wherein at least a part of the at least one functional module is outside the at least one secondary cavity.

10. The self-moving device of claim 4, further comprising:
at least one first interface corresponding to the at least one secondary cavity and capable of connecting to a second interface of the at least one functional module, wherein the at least one first interface comprises a first mechanical interface, the second interface comprises a second mechanical interface, and the first mechanical interface is configured to detachably connect to the second mechanical interface.

11. The self-moving device of claim 10, wherein the first mechanical interface is provided with an internal thread, the second mechanical interface is a through hole, the second mechanical interface is configured for a screw to penetrate, and the first mechanical interface is configured to be threaded with the screw.

12. The self-moving device of claim 10, wherein when the first mechanical interface is connected to the second mechanical interface, the at least one functional module covers an opening of a groove of the housing formed by the at least one secondary cavity.

13. The self-moving device of claim 4, wherein the housing comprises at least one cover plate corresponding to the at least one secondary cavity, and the at least one cover plate comprises a shielding state and covers an opening of a groove of the housing formed by the at least one secondary cavity in the shielding state.

14. The self-moving device of claim 4, wherein the at least one functional module further comprises at least one of a boundary detection module, an interaction module, a communications module, a positioning module, or an auxiliary working module.

15. The self-moving device of claim 14, wherein the boundary detection module comprises an ultrasonic module, a camera module, or a magnetic detection module, wherein the at least one secondary cavity to which the boundary detection module is mounted is disposed on an upper part or a front part of the housing.

16. The self-moving device of claim 14, the positioning module comprises a satellite positioning module or a beacon positioning module, wherein the at least one secondary cavity to which the positioning module is mounted is disposed on an upper part of the housing.

17. The self-moving device of claim 4, wherein the primary cavity is isolated from the at least one secondary cavity, such that the primary cavity is not exposed to an installer during an installation of the at least one functional module in the at least one secondary cavity.

18. The self-moving device of claim 4, wherein the primary cavity is isolated from the at least one secondary cavity, such as water vapor and dirt is prevented from entering the primary cavity.

19. The self-moving device of claim 4, wherein the primary cavity is isolated from the at least one secondary cavity in a sealed manner.

20. The self-moving device of claim 4, wherein in response to no functional module being mounted on the self-moving device, the control module is further configured to automatically operate the moving module and the working module according to a default mode of operation.

* * * * *